United States Patent [19]
Reinsch

[11] Patent Number: 5,229,835
[45] Date of Patent: Jul. 20, 1993

[54] OPTICAL MONITORING

[75] Inventor: Stephen J. Reinsch, Vista, Calif.

[73] Assignee: Hughes Aircraft Company, Los Angeles, Calif.

[21] Appl. No.: 741,851

[22] Filed: Aug. 7, 1991

[51] Int. Cl.⁵ .............................................. G01B 11/30
[52] U.S. Cl. ...................... 356/371; 356/446
[58] Field of Search ................ 356/371, 446, 429

[56] References Cited

U.S. PATENT DOCUMENTS

| | | | |
|---|---|---|---|
| 2,755,702 | 7/1956 | Cook | 356/446 |
| 4,019,066 | 4/1977 | Lucas et al. | 356/376 |
| 4,213,708 | 7/1980 | Lucas | 356/446 |
| 4,629,319 | 12/1986 | Clarke et al. | 356/446 |
| 4,770,536 | 9/1988 | Golberstein | 356/376 |
| 4,937,764 | 6/1990 | Komatsu et al. | 356/446 |
| 4,966,455 | 10/1990 | Avni et al. | 356/446 |
| 4,989,984 | 2/1991 | Salinger | 356/445 |

FOREIGN PATENT DOCUMENTS

| | | | |
|---|---|---|---|
| 0259112 | 11/1986 | Japan | 356/371 |
| 0278403 | 12/1987 | Japan | 356/371 |
| 0191010 | 8/1988 | Japan | 356/371 |

*Primary Examiner*—Richard A. Rosenberger
*Attorney, Agent, or Firm*—Georgann S. Grunebach; Terje Gudmestad; Wanda K. Denson-Low

[57] ABSTRACT

A hand held instrument for measuring roughness of a surface, such as "orange peel", on a painted surface employs a scanning disc (58) which mounts a unique unfocused light source (60) to project a diverging light beam (12,68) at the surface (14,54) in a circular scan pattern. Light (16) reflected from the surface is received by a sensor (18,80) which produces an output electrical signal (20) having an amplitude and frequency that follow the amplitude and frequency of reflected light received by the sensor. Electrical signals representing amplitude (32) and frequency (36) are suitably combined (38) to provide an output display (40) of magnitude of orange peel. A point light source (106–116) is provided by removing part of the integral lens (108) of a conventional light emitting diode and roughening the surface (112) exposed by removal of the lens to provide a diffusing exit window for the diode. A plate (114) having an aperture (116) smaller than the size of the light emitting chip (96) of the diode is placed on the roughened surface and a lens (130) is employed to control divergence of light from the point source so as to provide an unfocused, slightly diverging light beam (134).

5 Claims, 5 Drawing Sheets

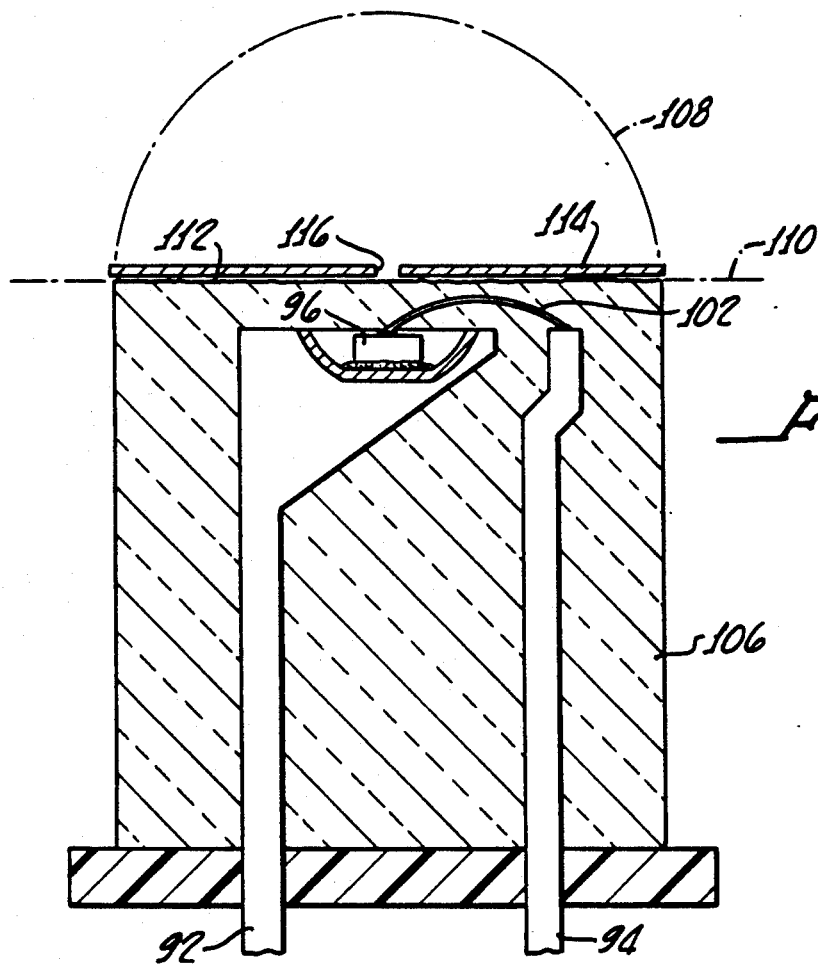
FIG. 8.
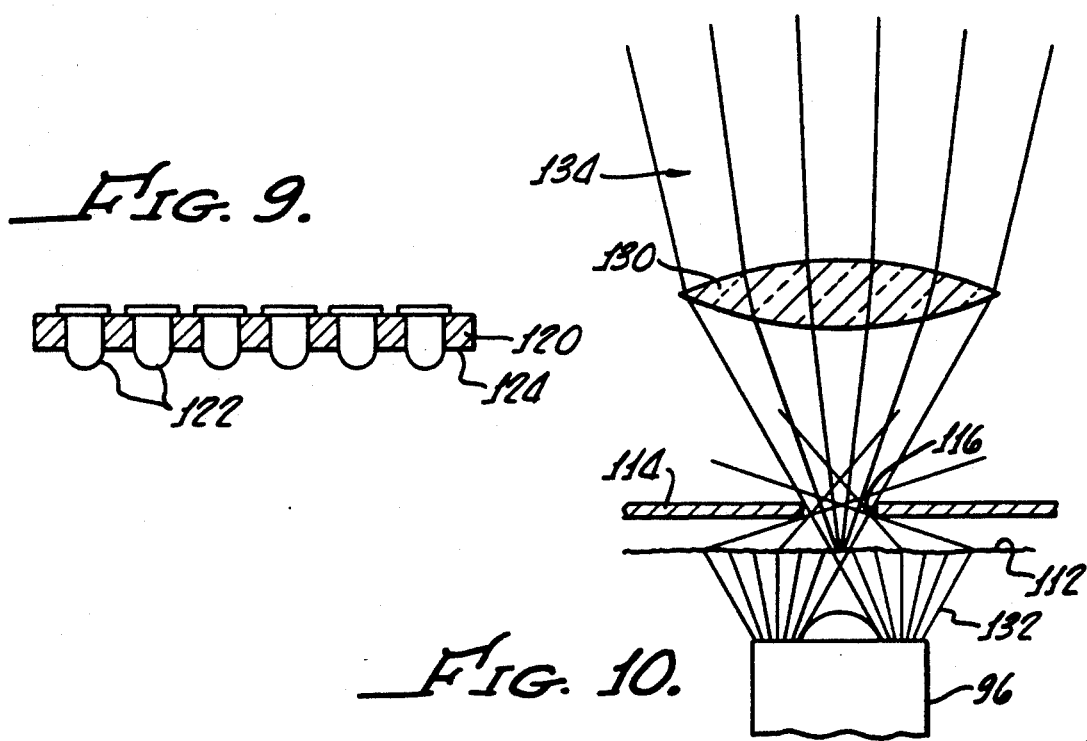
FIG. 9.
FIG. 10.

OPTICAL MONITORING

The present application is related to a co-pending U.S. patent application of Stephen J. Reinsch for Hand Held Paint Inspection Meter, Serial No. 07/741,383, Filed 08/07/91, now Pat. No. 5,179,425. The disclosure of this co-pending application is incorporated herein by this reference as though fully set forth.

BACKGROUND OF THE INVENTION

1. Field of the Invention

The present invention relates to optical monitoring and more particularly concerns optical monitoring methods and apparatus and an improved point light source therefor.

2. Description of Related Art

The present invention is applicable to measurement, analysis and inspection of various types of apparatus and can be used for optical monitoring in many different situations. The invention has been specifically designed and initially used for measurement of so-called "orange peel" effect of a painted surface. This effect is caused by small, closely spaced wrinkles of the paint surface. It is a measure of how smooth the top surface of the paint appears. Orange peel effect is presently measured subjectively, by eye. Prior meters, although capable of measurement of some parameters of paint quality, are unable to directly measure orange peel as an independent parameter. In the past a laser and position sensor have been used Helium neon lasers employed for such purposes are large and expensive. Where a solid state laser is substituted, the cost, power supply drain and power supply size are still serious handicaps. Other methods of optical inspection include detection of the edge of a projected image. The use of an image in this fashion requires relatively complex focused optics Such optics mean that focal length and focal positions are very critical, requiring careful control of distances to and from the paint surface. These problems and the significantly large size of such devices cause such inspection devices to be user sensitive and difficult to operate in a manner that will provide reliable, repeatable data.

Applicant is unaware of prior devices that directly measure orange peel. However, measurement of orange peel is important in the painting of automobiles because this effect is a major cause of poor paint jobs. Orange peel at present is quantified by subjective judgment, that is, by an individual, personal observation of the surface Orange peel is caused by various parameters of the paint process itself including humidity, temperature, and amount of solvent in the paint. If there were available an objective quantitative measure of orange peel it would be possible to relate such measure to process parameters so that the process could be corrected to decrease the adverse orange peel effect.

In some situations, such as the painting of large electrical appliances or computer housings, for example, it is desirable to obtain some degree of orange peel on the final paint surface. Nevertheless there still is lacking any way to quantify the amount of intended surface roughness for quality control.

Paint inspection meters of the prior art have measured other parameters of paint quality, such as gloss, color purity, and distinctness of image. The latter is defined as the distinctness of an image reflected from a painted surface. However, none of these prior devices can directly measure orange peel as an independent parameter. Further, prior paint inspection meters are neither small nor easy to handle. Prior art devices require two hands and, although they may be portable, are not readily transported and used by a single hand. Prior meters are often subjective in use so that different operators will obtain different results. Such measuring devices also require longer periods of time to make a measurement or may require cable attachment to power supplies and other stationary circuitry.

In my co-pending application for Hand Held Inspection Meter, identified above, a simple hand held paint inspection meter is described employing as a light source either a conventional light emitting diode and lens or a laser diode. However, the light emitting diode is not an effective point source, whereas the laser diode is expensive, requires significant amounts of power and is of a larger size.

Accordingly, it is an object of the present invention to provide optical monitoring methods and apparatus that avoid or minimize above mentioned problems.

SUMMARY OF THE INVENTION

In carrying out principles of the present in accordance with a preferred embodiment thereof a point optical source is employed to project an optical energy beam to an object to be monitored. The point optical source includes means for generating an unfocused beam of controlled divergence. Means are provided adjacent the object to be monitored for controlling area of the beam at the object and optical energy reflected from the object is detected. According to a feature of the invention, an improved point optical source is provided by a light emitting diode having a light exiting surface with diffusing means formed on the surface, and a small aperture. A lens is provided adjacent the diffused light exiting surface for controlling divergence of light projected from the aperture.

BRIEF DESCRIPTION OF THE DRAWINGS

FIG. 8 is an elevational section of a light emitting diode modified according to principles of the present invention;

FIG. 9 illustrates a fixture that is employed in modification of a conventional diode;

FIG. 10 illustrates light pattern emitted by the modified diode:

DESCRIPTION OF THE PREFERRED EMBODIMENT

Figure 1:
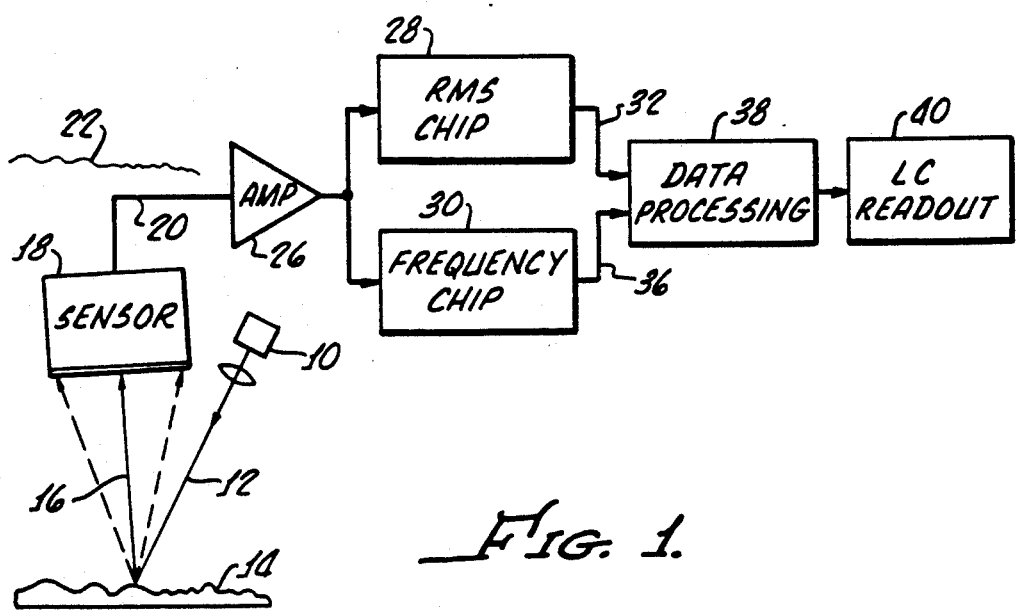
FIG. 1 is a block diagram of a surface inspection system embodying principles of the present invention.

A simplified block diagram of an optical monitoring apparatus embodying principles of the present invention is illustrated in FIG. 1. An optical source 10 mounted on a suitable scanning arrangement (not shown in FIG. 1) sends an optical beam 12 toward a surface 14 of which roughness is to be measured. The optical beam is caused to scan across the surface, which reflects light along a path 16 to a suitable sensor, such as a photo detector 18. The latter provides an electrical output signal on a line 20 which has a fluctuating configuration, as indicated at 22, that roughly matches the fluctuating elevation of the orange peel surface 14. FIG. 1 illustrates a short section extending from left to right in this figure of the painted surface, which section actually extends along a circular scanning path of the projected light beam, as will be more particularly described below. The output signal on line 20 from the sensor 18 is fed to an amplifier 26 and thence in parallel as an input to each of an amplitude analyzing chip 28 and a frequency averaging chip 30. Chip 28 provides on output line 32 a DC signal having an amplitude that effectively is an average of the RMS value of signal amplitude variations on line 20 over a single complete revolution of the scanning light beam. Similarly, chip 30 provides on output line 36 a DC output having a magnitude that is the average of the frequency, over a number of revolutions of the measurement, of its input from amplifier 26. The amplitude and frequency signals provided on lines 32,36 are combined in a data processing circuit 38 having an output to a liquid crystal numerical readout 40 that displays a quantitative measure of surface roughness.

Further details of operation of this system are set forth in the above identified co-pending application for Hand Held Paint Inspection Meter.

Figure 2:
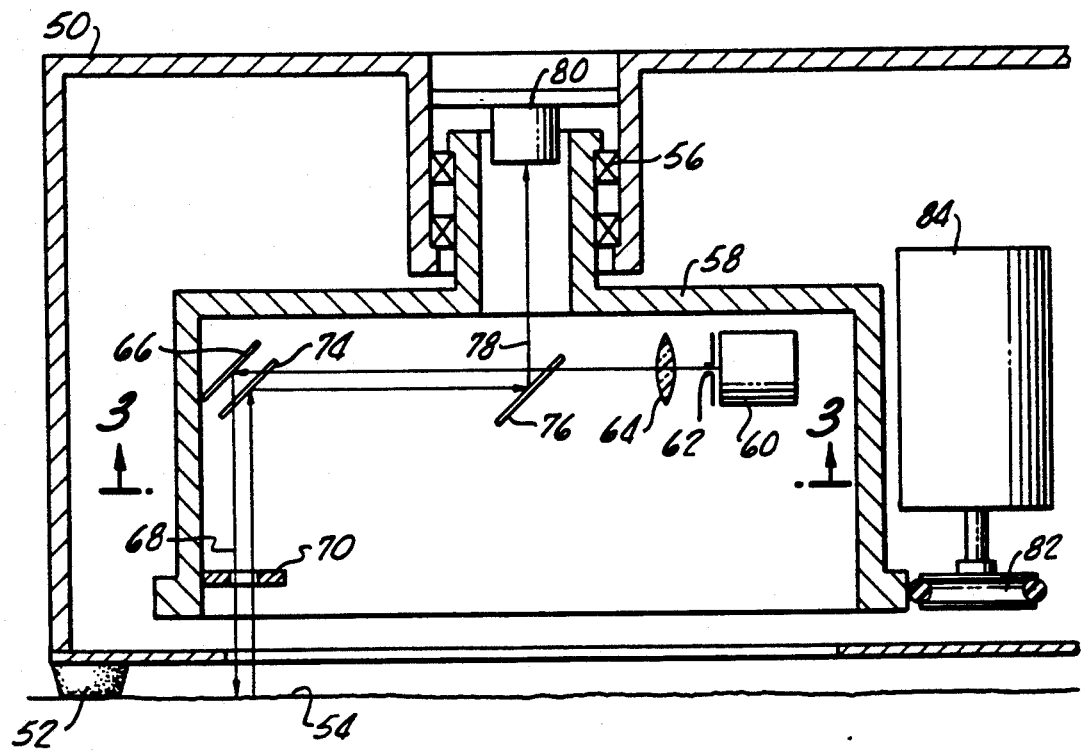
FIG. 2 is a simplified sectional elevation of a hand held painted surface inspection meter embodying principles of the present invention.
Figure 3:
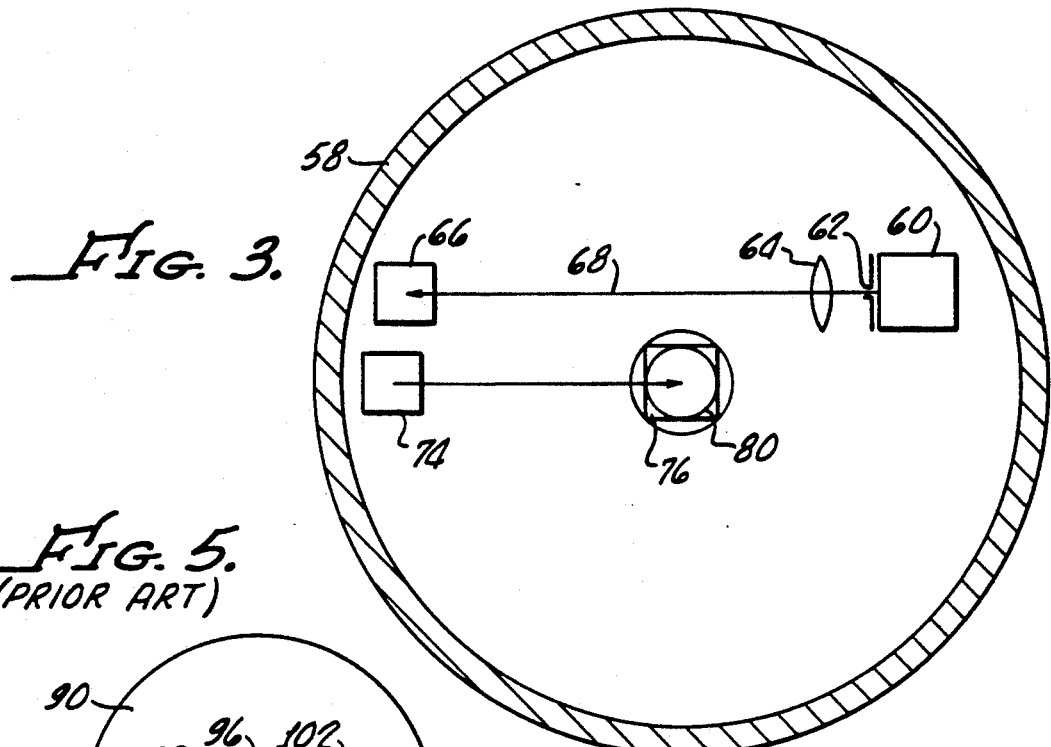
FIG. 3 is a plan view of portions of the apparatus of FIG. 2.
Figure 5:
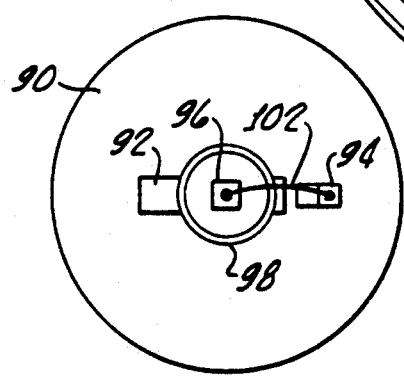
FIGS. 4, 5, 6 and 7 illustrate different aspects of a conventional prior art light emitting diode.
Figure 6:
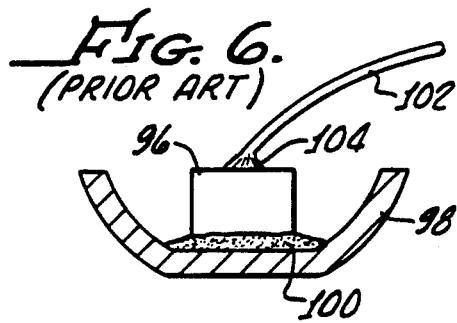
Figure 4:
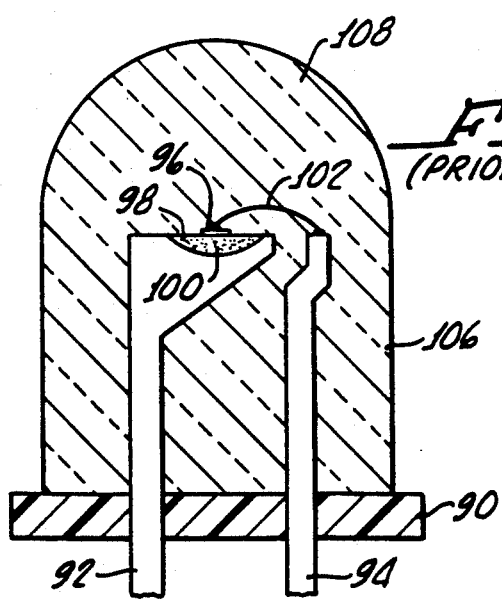

The above identified patent application also describes details of the hand held meter that mounts the circuitry of FIG. 1. A simplified illustration of the mechanical arrangement of the hand held meter is illustrated in FIGS. 2 and 3, which show a housing 50 (FIG. 2) having feet 52 adapted to rest upon a surface 54 of which roughness is to be measured. By means of journals 56, the housing rotatably mounts a cup-shaped disc 58 which fixedly carries an optical point source 60, including an aperture 62 and a lens 64, which sends an unfocused controlled divergence beam to a first reflecting mirror 66 (see also FIG. 3), also fixedly mounted to the rotating disc. Mirror 66 reflects the light beam along a path 68 (parallel to the disc rotation axis) through an apertured plate 70, fixed to and rotating with disc 58 to impinge upon the surface 54. Light reflected from the surface 54 is received by a second reflecting mirror 74, fixedly carried by the rotating disc and is then directed to a third disc-mounted mirror 76, which reflects the received light along a path 78 axially of the rotating disc. Light in path 78 is received by a stationary photo transistor light sensor 80, which is fixed to housing 50. The latter is rotated by a friction drive wheel 82 driven by a motor 84 mounted in the housing 50. Suitable electronics, not shown in FIG. 2, are also mounted within the housing for providing power supplies and performing the functions illustrated in connection with FIG. 1.

The system described to this point is primarily the same as the system described in the above identified co-pending application. However, according to the present invention, an improved point light source is employed. The arrangement of the improved point light source described herein does not employ any focused beam, and thus no exact image must be focused on the paint, nor is there any image focusing needed on the detector input. Accordingly the system has no significant lens problems, nor does it have focusing or depth of field problems.

Preferably the point light source is a modified bright red light emitting diode, commonly known as an LED. The LED is a more reliable and rugged source than an incandescent lamp. A red LED is presently preferred since it is much easier to work with in miniature than an infrared LED. Further, the LED is significantly cheaper than a laser and does not require a sophisticated power supply.

The improved light source that is employed in the present invention is a modification of a conventional light emitting diode Such a conventional diode, before modification according to principles of the present invention, is illustrated in FIGS. 4 through 7. The conventional light emitting diode includes a base 90 carrying flat wires 92,94 which extend from the base to support a diode chip 96 that is carried in a reflective cup 98 on an adhesive bed 100. A fine gold wire 102 connects a contact 104 on the light emitting chip 98 to the second wire 94. The flat wires, diode chip and connecting wire are encapsulated in an integral clear plastic body 106 which has an upper portion 108 curved to form a partly spherical lens.

Figure 7:
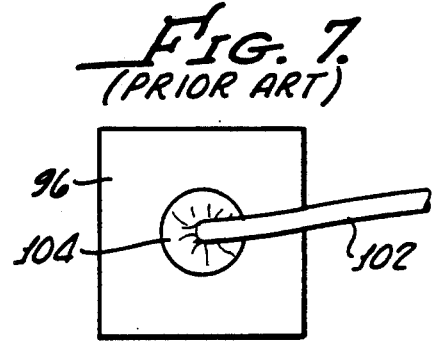

FIG. 7 illustrates the area of the chip 96 that emits light, showing the presence of the contact 104 in central area of the light emitting area. At least partly because of the presence of this contact in the central portion of the light emitting area, the light emitting diode, without modification, cannot provide a suitable point source of light.

To modify the conventional diode of FIGS. 4 through 7 according to principles of the present invention, the upper portion 108 of the encapsulating body 106 is severed or otherwise removed (as by grinding, for example) along a surface 112, and the severed partly spherical lens 108 is discarded. The surface at which the lens was severed is then roughened, as by for example being rubbed with a suitable abrasive to provide a roughened surface that diffuses light emitted from the chip 96.

The roughened diffused surface 112 acts in a manner similar to a rear projection screen. When the diode is operating, its surface is brightly lit, but the diffused surface is not sufficiently transparent to enable one to see through it into the chip itself A thin black plastic plate 114, having an aperture 116, is then secured, as by adhesive or other connecting means, to the roughened surface 112. Preferably, for a chip that is in the order of about 0.030 inches on a side, aperture 116 has a diameter of about 0.020 inches and is aligned with a central area of the chip. This aperture forms the light that emanates from the chip into a point source of light, which helps to achieve the desired high resolution of the system.

To remove the lens portion 108 of a plurality of conventional diodes in a simplified manufacturing process, a fixture, such as that illustrated in FIG. 9, may be employed. A flat plate fixture 120 is provided with a number of holes into each of which is placed an individual conventional unmodified light emitting diode The thickness of the plate 120 is such that each diode has an end portion, such as portion 122, protruding from the other side of the plate by a like amount. With this arrangement it is a simple matter, while holding the diodes securely in the plate, to cut all ends of the diodes protruding from the plate flush with the plate surface 124 so that a number of diodes can be prepared rapidly. Surfaces 112 can also be textured in this fixture, or the diode ends can be removed by an abrading device that simultaneously provides the desired texture.

A lens 130 (FIG. 10) is then mounted to the diode adjacent the apertured plate 114, being spaced from the apertured plate by approximately 3/32 of an inch, as an example. The purpose of the lens is to control divergence of light emitted by the diode through the diffusing surface 12. FIG. 10 illustrates certain rays 132 of the diode chip impinging upon the diffusing surface 112 and being projected from there in a multitude of different directions through the small aperture 116. Light transmitted from the diffusing surface through the aperture is received by lens 130, which collects light and provides a light beam 134 with a controlled amount of divergence. Thus the lens both controls divergence of the beam and gathers additional light from the point source. The beam 134 is provided as a conical shaped beam with light rays fanning out from a very small bright point, namely aperture 116. The angle of the beam (e. g. beam width) is determined to match the range of surfaces to be measured. In general the higher the amplitude of the orange peel effect the wider the beam angle that is used. Conversely, for a smaller range of surface peel variation from coarse to smooth, a smaller angle of beam divergence is employed.

Because the light rays fan out like spokes from a central point, there is no focal point where the light hits the painted surface or the detector. There is no focusing lens system that is required to have a pre-defined focus nor depth of field nor angle sensitivity. The lens merely helps to shape the beam but does not provide any focusing The lens does not focus the beam on the paint nor on the detector. Therefore, having no imaging lenses, image lens problems are eliminated. The distance and angle of the painted surface can change slightly without affecting the output of the detector. If an imaging system were employed, on the other hand, the device would be exceedingly sensitive to distance and angle changes. For the short distances involved in measurement with this device, specific positions of a focused lens system are very critical, whereas the use of the described light source provides a beam that appears to focus wherever it hits. The light source described herein forms a suitable image anywhere within a range of about two inches for the distance between the painted surface and the meter. If one were to use a focused beam, on the other hand, to focus the image on a surface of the paint or the detector, the allowable depth of field is so small that very small changes in distance between the instrument and the surface could cause great variations in the output.

Figure 11:
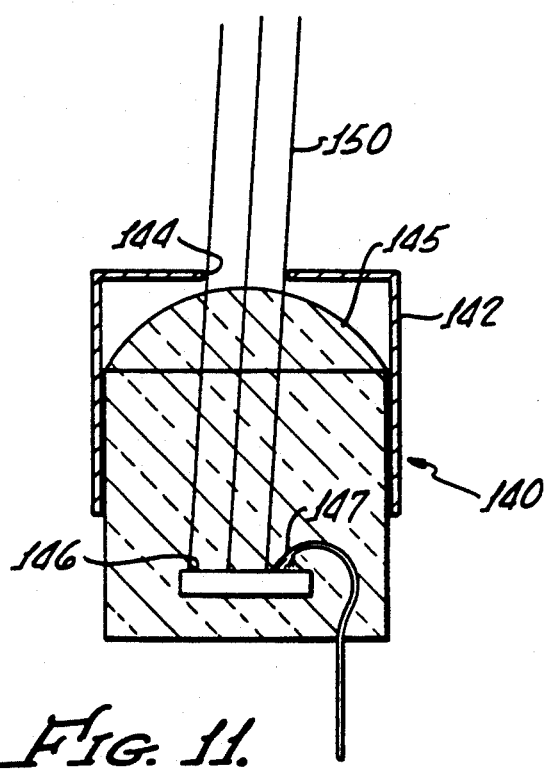
FIG. 11 illustrates a light sensitive detector and aperture therefor.
Figure 12:
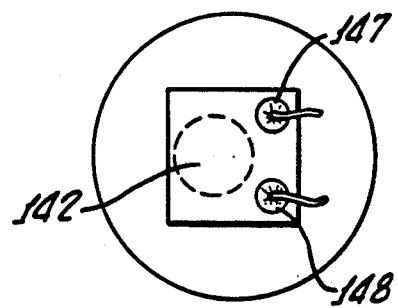
FIG. 12 is a plan view of the detector of FIG. 11.

Illustrated in FIG. 11 is a detector 140 which is basically unmodified photo transistor, except that a cap 142 having an aperture 144 therein is applied over the body of the detector 140. The detector 140 includes an integral plastic lens 145 encapsulating a photo sensitive chip 146 having a pair of contacts 147,148 (FIG. 12) in its normal, unmodified form. At present it is preferred to employ a photo-Darlington transistor, which is a conventional photo transistor having an added cap 142 with an aperture of about 0.040 inches. The conventional transistor is modified solely by addition of cap 142. With such an arrangement, and with a beam of light having a diameter of between 0.25 and 0.38 inches impinging upon the detector area, the beam can shift a significant amount and still be directed through the detector aperture. This feature of a beam diameter larger than the detector aperture is significant because different portions of the surface being inspected may reflect the beam at different angles so that the beam will not be precisely lined up at all times. Because of the presence of contacts 144,146 on the surface of the photosensitive transistor, it is preferred to mount the transistor so that incoming light is directed at a slight angle, as indicated by beam 150 in FIG. 11. Therefore, the beam does not impinge upon the contacts, which of course are not photosensitive.

Figure 13:
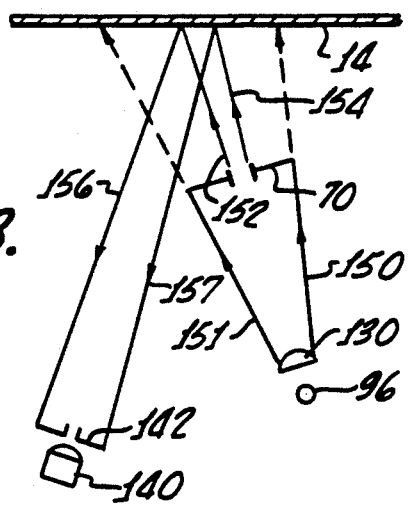
FIG. 13 illustrates the path of a light beam projected from the light source.

Illustrated in FIG. 13 is an exemplary schematic arrangement of light source and sensor. The drawing shows a light emitting diode 96 separated by about 3/32 of an inch from a lens 130. In this example the lens has a diameter of about 6 millimeters diameter and a 9 millimeter focal length. The drawing also illustrates aperture 70 mounted to the meter housing, so as to be close to the surface being monitored. In a typical instrument the optical distance from the light source to the surface 14 being monitored is approximately 1⅝ inches, and the distance from the aperture 70 to the surface is about 13/16 of an inch, just less than half the distance between the light source and surface. In this exemplary embodiment the size of aperture 70 is 0.115 inches. Optical path length from the painted surface 14 to the photosensitive transistor 140 is about 2⅛ inches in an exemplary embodiment, with the aperture 144 in plate 142 in this example, being 0.040 inches.

As can be seen in FIG. 13 the beam from the point light source diverges, as indicated by rays 150,151, and thence, from aperture 70, forms a smaller area beam indicated by rays 152,154. The narrower beam 152,154 impinges on surface 14 and is reflected back as indicated by rays 156,157 to pass through aperture plate 142 to the photo transistor 140. The light beam expands from the 0.115 inch aperture 70 to a diameter of about 0.375 inch at the aperture plate 142 of the photosensitive transistor.

Figure 14A:
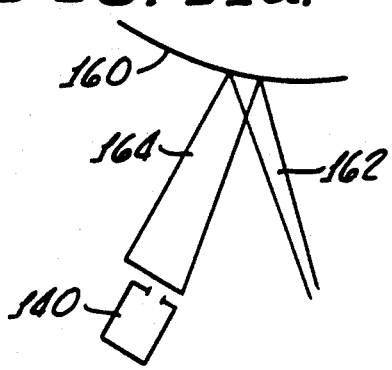
FIGS. 14a and 14b illustrate certain aspects of operation of the apparatus.
Figure 14B:
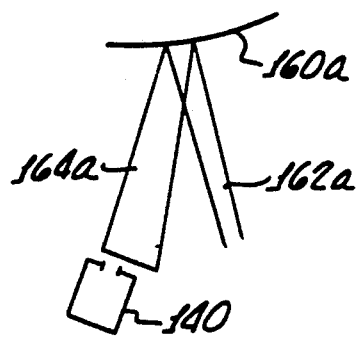

FIGS. 14a and 14b illustrate the relation between the relatively large beam diameter at the photosensitive transistor 140 and the relatively small photosensitive transistor aperture. When impinging on a surface, such as surface 160, angled as indicated, the incoming beam 162 is shifted as indicated at 164 slightly to the left (as viewed in FIG. 14a) of the photosensitive transistor 140. Even so, the larger beam area still covers the smaller sensor aperture.

With a reflective surface angled as indicated at 160a in FIG. 14b, the projected beam 162a is reflected as indicated at 164a, being shifted slightly toward the right as viewed in this figure. Nevertheless, the larger beam 164a still covers the smaller aperture of the photo transistor.

Figure 15:
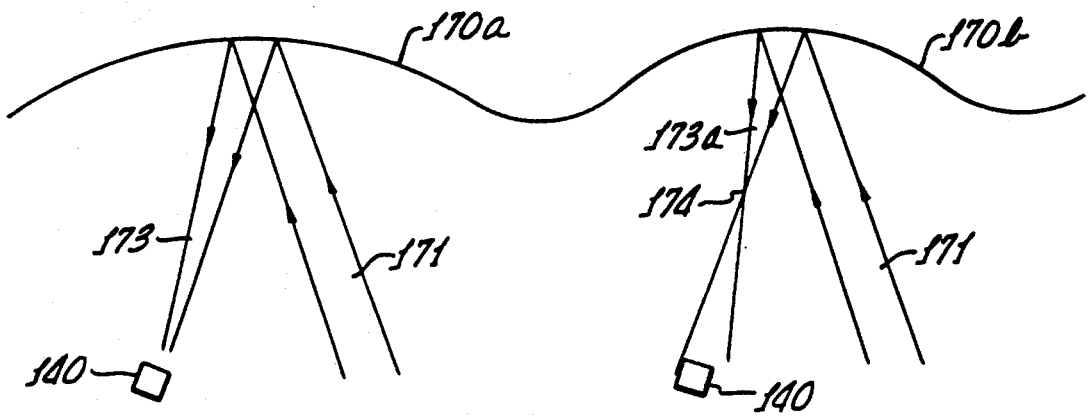
FIG. 15 illustrates operation of a collimated light beam of a prior art device.

As previously noted, the light beam from the point light source diverges. It is not collimated, as in other optical sensing instruments. This divergence provides a significant advantage. Indicated in FIG. 15 is a prior art collimated beam reflected from a dip in an orange peel paint, shown at 170 with a magnified curvature. The amount of light that is received by the sensor is not proportional to the curve of the dip in the surface 170. For example, with an incoming collimated light beam 171 impinging on a surface 170a having a relatively large radius of curvature, the reflected light tends to converge, providing a bright spot or narrowed beam area at the detector 140. Numeral 173 indicates this converging reflected light beam. Where the surface, such as surface area 170b of FIG. 15, has a smaller radius of curvature, the reflected light should be focused with greater intensity onto the detector for use in measurement of orange peel. However, with a collimated projected beam 171 impinging up the smaller radius of curvature area 170b, the reflected beam converges, as indicated at 173a, before reaching the detector, and provides a bright spot at a point 174, which is in front of the detector. Thus a dark area will occur at the detector, which is precisely the opposite of the brighter spot that should be there to represent a measure of this smaller radius of curvature reflecting surface.

Figure 16:
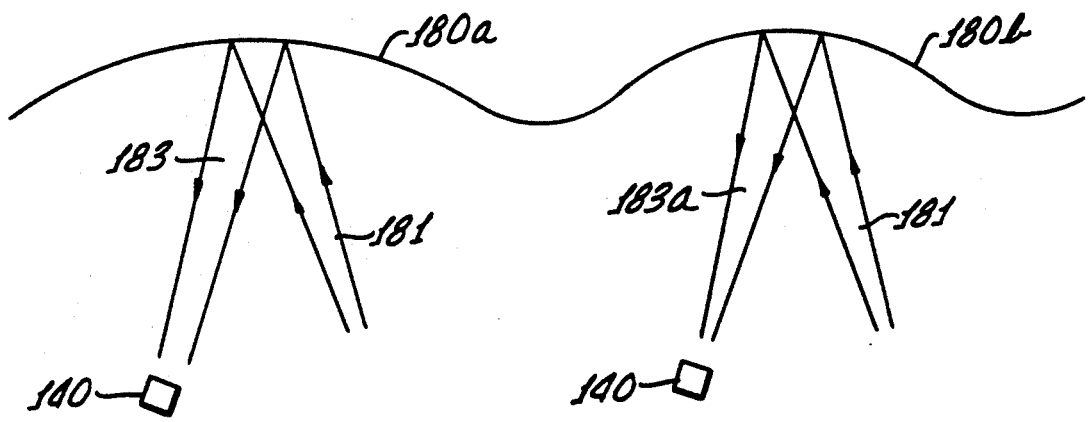
FIG. 16 illustrates operation of a source employing a diverging beam of the present invention.

FIG. 16 illustrates conditions similar to those described in connection with FIG. 15, but employing the slightly diverging beam from the point source described herein. A diverging beam 181 projected against a surface 180a of relatively large radius of curvature is reflected back as a slightly converging beam 183 which has a relatively large area at detector 140. Where the projected diverging beam 181 impinges upon a surface area 180b, having a smaller radius of curvature, the reflected beam 183a has a still sharper beam angle that converges more rapidly at the detector 140. This provides a brighter light at the detector and a higher amplitude signal that helps to characterize the reflecting surface. The slightly diverging beam provides a reflected image that never crosses over into a negative image or bright spot, as indicated at 174 in FIG. 15, if the radius of curvature of the reflected surface is too small.

As indicated above, resolution range of the apparatus is controlled by the size of the point source, the diverging angle of the beam, and the aperture size on the detector. The smaller point source gives greater resolution, as does a smaller detector aperture. On the other hand, a wider beam angle will accept high amplitude at a given frequency (e.g. distance between successive bumps of the orange peel surface).

The painted surface bends the projected light rays (reflects them at different angles) because of bumps and dips on the paint surface. The rays may be reflected toward each other in a converging pattern, or sometimes they may be reflected away from each other in a diverging pattern. This causes bright or dark spots in the detector area. By scanning the light beam across either the detector or the paint, the light and dark spots move across the detector. These light changes are the information that represent characteristics of the painted surface.

The operation of the device described herein is the same as that described in the above identified co-pending application. The housing is placed directly against the surface of which orange peel is to be measured so that the entire apparatus may rest, via its rubber feet, directly on the surface. The disc is rotated and light is projected downwardly toward the surface and reflected back from the surface as the disc 58 rotates. Because of the roughness of the surface the amplitude and direction of the reflected light varies, and therefore overall intensity of reflected light received by the photo transistor varies in accordance with the nature of the variation of the surface roughness The apparatus measures amplitude and frequency variations of reflected light. Measured amplitude corresponds to surface angle or inclination at successive areas along the scan path, while measured frequency of intensity variations correlates with spacing or density of surface roughness features. Stated otherwise, the magnitude of amplitude variation of received reflected light corresponds to the height of the bumps or wrinkles on the surface being inspected, and the frequency of intensity variation of received reflected light corresponds to distance between bumps or wrinkles. Measured amplitude and frequency of the signal provided by the photo transistor sensor are then employed to provide a quantitative measure of surface roughness, as described in the above identified co-pending patent application.

There have been described methods and apparatus for optical monitoring employing simple low cost apparatus that readily lends itself to miniaturized applications for a small hand held device. Although the arrangement has been described as being employed in a paint surface inspection meter, it may be applied for inspection of other shiny or reflective surfaces of metal or plastic. The apparatus may be used in a factor conveyor belt system. Mounted in a fixed position, the device will readily monitor parts passing by on the conveyor.

What is claimed is:

1. Optical monitoring apparatus comprising:
   source means for projecting an unfocused optical energy beam toward an object to be monitored, said source means comprising:
   point optical source means for generating an unfocused beam that diverges from a point, said source means comprising a light emitting diode having a light diffusing light exiting surface, and means for controlling divergence of said beam,
   means adjacent the object to be monitored for controlling area of said beam at said object, and
   detector means for sensing optical energy reflected from said object.

2. The apparatus of claim 1 including scanning means for scanning said beam across an area of a surface to be monitored, means responsive to said detector means for generating a varying electrical signal representing intensity of optical energy reflected from said object and received by said detector means, and means for providing an output indicative of amplitude and frequency of said electrical signal.

3. The apparatus of claim 1 wherein said point optical source means includes an apertured plate secured to said light exiting surface for limiting area of said beam at said source means.

4. The apparatus of claim 1 wherein said detector means comprises an optical energy detector and aperture means for transmitting an unfocused diverging limited area beam of optical energy to said detector.

5. The apparatus of claim 1 wherein said light emitting diode has an emitting area, and including an apertured opaque member on said surface having an aperture therein that is smaller than said diode emitting area.

* * * * *